United States Patent
Dole et al.

(10) Patent No.: US 6,302,450 B1
(45) Date of Patent: Oct. 16, 2001

(54) COUPLING FOR PLAIN END PIPE

(75) Inventors: Douglas R. Dole, Whitehouse Station, NJ (US); Charles W. Shultz, Easton, PA (US)

(73) Assignee: Victaulic Company of America, Easton, PA (US)

( * ) Notice: Subject to any disclaimer, the term of this patent is extended or adjusted under 35 U.S.C. 154(b) by 0 days.

(21) Appl. No.: 09/177,987

(22) Filed: Oct. 22, 1998

(51) Int. Cl.[7] ................................................. F16L 25/00
(52) U.S. Cl. ............................ 285/328; 285/373; 285/112
(58) Field of Search ..................................... 285/112, 373, 285/419, 328, 340, 423

(56) References Cited

U.S. PATENT DOCUMENTS

| | | | |
|---|---|---|---|
| 1,789,379 | * 1/1931 | Dillon | 285/373 |
| 1,955,642 | * 4/1934 | Laughlin . | |
| 2,459,251 | 1/1949 | Stillwagon | 285/194 |
| 2,491,004 | 12/1949 | Graham | 285/193 |
| 2,776,153 | * 1/1957 | Smith | 285/373 |
| 2,840,395 | 6/1958 | Tarnow | 285/321 |
| 3,116,078 | 12/1963 | Scherer | 285/104 |
| 3,252,192 | 5/1966 | Smith | 24/81 |
| 3,453,006 | 7/1969 | Levake | 285/104 |
| 3,695,638 | * 10/1972 | Blakeley | 285/423 |
| 4,299,413 | * 11/1981 | Neher | 285/373 |
| 4,372,587 | 2/1983 | Roche | 285/238 |
| 4,409,708 | * 10/1983 | Hauffe | 285/373 |
| 4,568,112 | 2/1986 | Bradley, Jr. et al. | 285/238 |
| 4,871,179 | 10/1989 | Bell et al. | 277/34.6 |
| 5,058,931 | * 10/1991 | Bowsher | 285/373 |
| 5,190,324 | 3/1993 | Bird et al. | 285/328 |
| 5,257,834 | 11/1993 | Zeidler et al. | 285/328 |
| 5,507,528 | 4/1996 | Mastrosimone | 285/22 |
| 5,605,357 | * 2/1997 | Bird | 285/15 |
| 5,730,476 | * 3/1998 | Gouda . | |

* cited by examiner

Primary Examiner—Teri Pham Luu
(74) Attorney, Agent, or Firm—Abelman, Frayne & Schwab

(57) ABSTRACT

A segmented pipe coupling is disclosed which includes a successive series of circumferentially discontinuous teeth which extend radially inward along the interior arcuate surface of the coupling and are intended to securely engage a plain ended pipe without cutting into the pipe exterior. The teeth are preferably formed by superimposed multi-lead right hand and left hand threads along the inner arcuate portion of the segmented pipe coupling.

22 Claims, 8 Drawing Sheets

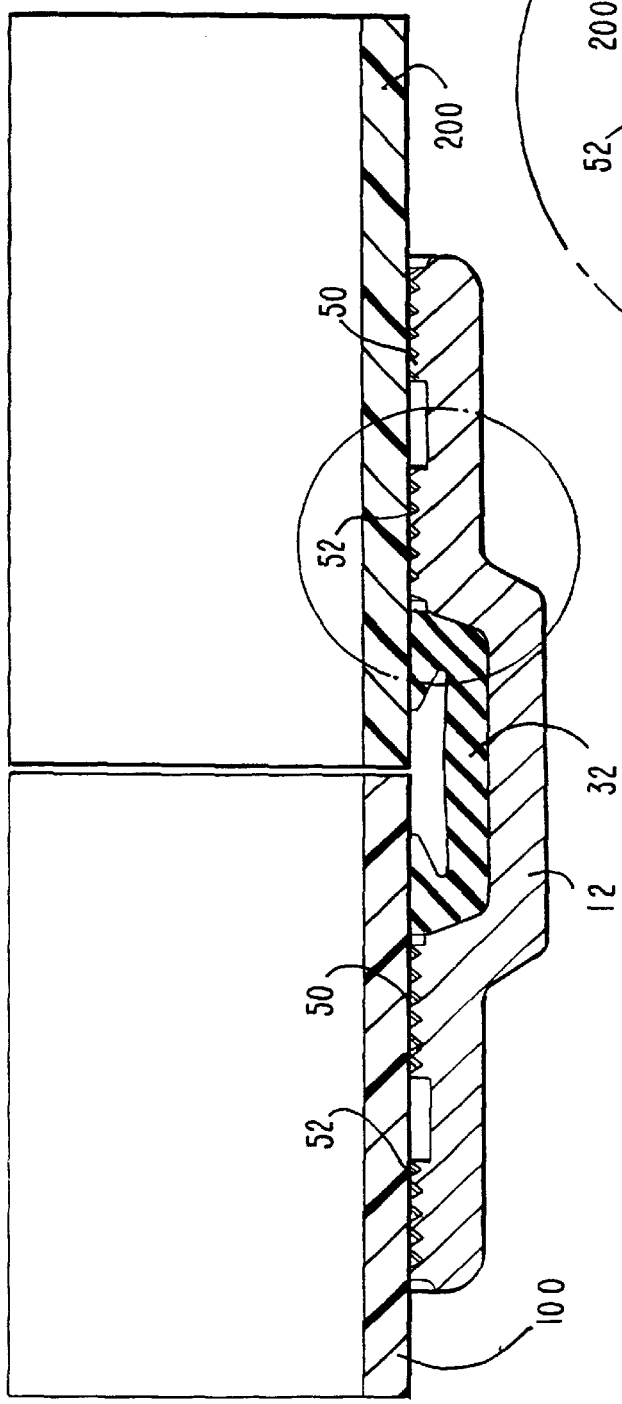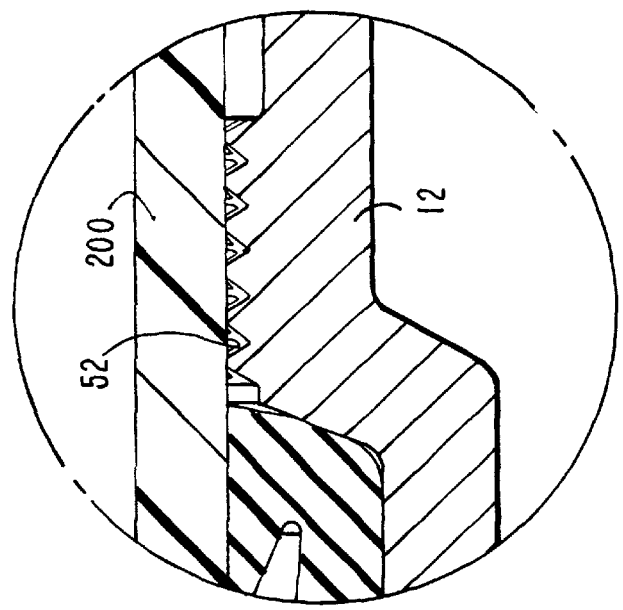

COUPLING FOR PLAIN END PIPE

FIELD OF THE INVENTION

This invention relates to a coupling for plain ended pipe that is intended to securely engage the plain ended pipe without cutting into its pipe exterior. Such a coupling can be used to connect two plain ended pipes together, or one such pipe to another component such as a grooved or flanged component, or to another plain ended pipe constructed of a different material which requires coupling teeth that cut into its exterior surface.

BACKGROUND OF THE INVENTION

A variety of segmented pipe couplings are well known in the art, the respective coupling segments of such coupling being comprised of castings, typically of ductile iron, whose interior surface is configured to tightly engage the exterior circumference of the pipe as the coupling segments are typically bolted together in close mechanical engagement. One such type of coupling segment is shown in U.S. Pat. No. 4,601,495, assigned to the assignee of the present invention. It includes circumferentially extending keys at their respective opposite sides, which are shaped to be received within complementary grooves cut or otherwise formed in the exterior circumference of the pipe. The keys act to resist axial stresses that are generated in the pipes, with the axial stresses being absorbed by the coupling as a tensile or a compressive stress. A sealing gasket is also provided intermediate the sealing spaced keys.

The present invention is however directed to a segmented pipe coupling which is intended to be secured to a plain ended pipe. That is, a pipe that does not have a circumferential groove for the reception of a complementary key formed along the internal circumference of the coupling. Such plain ended pipe couplings must include some means along their inner circumferential area to tightly engage the exterior surface of the plain ended pipe, and maintain such secure engagement under varying temperature extremes and loads. One such coupling formed of a ductile iron casting intended for utilization in conjunction with high density polyethylene plain ended pipe are the commercially available Styles, 994, 995, and 997 couplings of the Victaulic Company of America, Easton, Pennsylvania. That coupling includes sharp circumferential teeth which engage, and actually cut into the pipe wall as the coupling torque bolts are tightened. A variation of this type of coupling segment includes separate sharp teeth formed in hardened steel cutter members inserted within the inner circumference of the coupling for cutting into the exterior surface of the pipe, as is disclosed in U.S. patent application Ser. No. 08/690,481 filed on Jul. 31, 1996 issued as U.S. Pat. No. 5,911,446 and assigned to the assignee of the present invention. Such sharp circumferential teeth that puncture and bite into the exterior wall of the plain ended pipe are typically required where the coupling is formed of cast ductile iron and the pipe is formed of high density polyethylene. This is necessary for adequate holding strength under a wide temperature range. High density polyethylene has a substantially larger coefficient of thermal expansion than the iron forming the coupling. Thus it will shrink considerably in diameter and length when cooled and expands considerably in diameter and length when heated. Since the ductile iron which forms the coupling has a substantially smaller coefficient of expansion, the high density polyethylene pipe will outshrink the ductile iron coupling when cooled and outexpand the ductile iron coupling when heated. Hence it is necessary for the teeth to actually cut into the exterior wall of the high density polyethylene pipe in order to properly maintain a secure coupling engagement therebetween when the pipe coupling is cooled. This prevents coupling disengagement when the high density polyethylene pipe will shrink more in diameter relative to the ductile iron coupling upon such cooling. Further, the shrinking in pipe length puts a substantial axial load on the couple joint. To hold the joint together, it is required that the coupling stay sufficiently engaged on the reduced diameter of the high density polyethylene pipe, thereby necessitating the utilization of teeth which actually cut into the pipe exterior.

While such prior couplings have provided satisfactory performance in conjunction with plain ended high density polyethylene pipe, it creates certain disadvantages when used in a pipe coupling intended for polyvinylchloride pipe or other pipe materials (e.g., fiber reinforced plastic pipe) which have a lesser coefficient of thermal expansion than high density polyethylene pipe. The sharp circumferential teeth required for coupling to plain ended high density polyethylene pipe would create circumferential notches in the polyvinylchloride pipe. Such notches are detrimental to the pipe's long term performance, since such notches create potential crack initiation points. Similarly when used with fiber reinforced plastic pipe the teeth cut the fibers, which may typically be carbon, glass, or other reinforcing fibers.

U.S. Pat. No. 4,568,112 has recognized the desirability of providing a segmented coupling for polyvinylchloride pipe which avoids the piercing or breaking of the exterior surface of the polyvinylchloride pipe. That patent employs continuous circumferential ribs in alternating combination with a rough machine phonographic type finish. While not cutting into the pipe, such continuous circumferential depressions disadvantageously create sources of high stress concentration within the polyvinylchloride pipe. Further, the circumferential gripping ribs shown in U.S. Pat. No. 4,568,112 contain a 1° taper on the gripping zone of the flange adapter. This taper is in the direction that creates deeper pipe depressions at the back end or outboard end of the flange adapter. Since this is an area of highest stress in the pipe created by the flange adapter, it will be a point of highest stress in applications involving pipe bending and cyclic pressure. Since this is an area where pipe failure oftentimes is initiated, the flange adapter with its 1° taper exacerbates this potential for pipe failure. Another disadvantage of the coupling structure shown in U.S. Pat. No. 4,568,112 is that the two coupling segments do not meet pad to pad. This requires the installer to measure the torque being applied to the bolts as the segments are pulled together and into contact with the pipe surface to insure that they will be at an adequate magnitude to prevent the pipe from being pulled out of the flange, but not at too high a level to overstress the pipe or flange. Relying on the measurement of torque magnitude to achieve a specific bolt load tends to be imprecise due to the inherent imprecision of bolt load generation as well as anticipated variations generated by the installer. Thus it would be desirable to insure proper gripping force without resorting to bolt torque measurement.

SUMMARY OF THE INVENTION

The present invention provides a segmented pipe coupling in which each of the arcuate coupling segments include a successive series of circumferentially discontinuous teeth which extend radially inward along the interior arcuate surface of the coupling segment. Each of the teeth includes an end section and a central radially inward substantially flat section. The flat sections of the successive series of teeth provide a plurality of circumferentially discontinuous and space gripping surfaces which are adapted to engage and dent the plain ended pipe (typically polyvinylchloride) without cutting into the pipe exterior. Spaced dents are formed on the surface of the pipe by the teeth as the coupling is tightened. While not cutting into the pipe surface, the force required to displace the plastic away at the multiple spaced dents is substantial and provides a secure holding force.

It has been found particularly advantageous to form the spaced teeth by superimposed multi-lead right and left handed threads along the interior arcuate surface. Such threads can be formed by either (a) successively machining the right and left hand threads into an internal arcuate portion of the segmented pipe coupling, (b) casting the thread pattern into internal arcuate portion of the segmented pipe coupling, or (c) providing couplings with separate knurled inserts having the desired multi-lead right and left hand thread configurations.

The circumferentially discontinuous, or interrupted, thread configuration advantageously reduces the coupling assembly bolt torques so that it is significantly easier for the interrupted threads to deform the plastic pipe surface than with a 360° continuous circumferential ribs, as shown in aforementioned U.S. Pat. No. 4,568,112. With the discontinuous teeth of the present invention, the plastic of the pipe has paths of lesser resistance to move to than with circumferential ribs. More specifically, the discontinuous teeth of the present invention permit the plastic of the pipe to move radially inward and axially along the pipe and circumferentially between the teeth. Since the 360° ribs do not permit circumferential displacement, less load is required by the present invention to generate an equal depth grip with the exterior surface of the plastic pipe.

As a further advantageous feature of the present invention, each of the arcuate coupling segments include a flange at its arcuate end with a radially inward contact shoulder. The flange includes a bolt receiving aperture at its outward radial end for bolting the arcuate coupling segments together about the plain ended pipe. The contact shoulders of arcuately adjacent coupling segments are predeterminedly configured to meet as the adjacent coupling segments are bolted together, with such meeting in a pad-to-pad arrangement limiting their radially inward movement about the plain ended pipe. This establishes the termination of bolt tightening, without having to resort to the impreciseness of measuring the bolt load.

Accordingly, a primary object of the present invention is to provide a segmented pipe coupling for securement to plain ended pipe, which includes a successive or circumferentially discontinuous teeth which extend radially inward and are configured to securely engage the pipe without cutting into the pipe exterior.

A further object of the present invention is to provide such a segmented pipe coupling which is formed of cast ductile iron and intended to engage plain ended polyvinylchloride pipe.

A further object of the present invention is to provide such a segmented pipe coupling in which the individual teeth include a substantially flat pipe engaging portion, and the teeth are formed of superimposed multi-lead right and left handed threads along the interior arcuate surface of the coupling segment.

Yet another object of the present invention is to provide such a segmented pipe coupling in which successive circumferentially adjacent teeth are axially spaced.

Yet a further object of the present invention is to provide such a segmented pipe coupling in which the teeth include a plurality of individual circumferentially aligned and axially spaced teeth.

Still another object of the present invention is to provide a method of forming a plurality of circumferentially spaced and discontinuous blunt gripping teeth along the interior surface of a segmented pipe coupling intended for plain ended pipe, which includes the steps of forming a multi-lead right hand thread and multi-lead left hand thread superimposed over the right hand thread portion.

These as well as other objects will become apparent upon a review of the following drawings and detailed descriptions.

BRIEF DESCRIPTION OF THE DRAWINGS

FIG. 7 is a front cross-sectional view showing the lower portion of FIG. 5.

FIG. 8 shows further details of a portion of FIG. 7, as indicated by the circled portion thereof.

DETAILED DESCRIPTION

Figure 1:
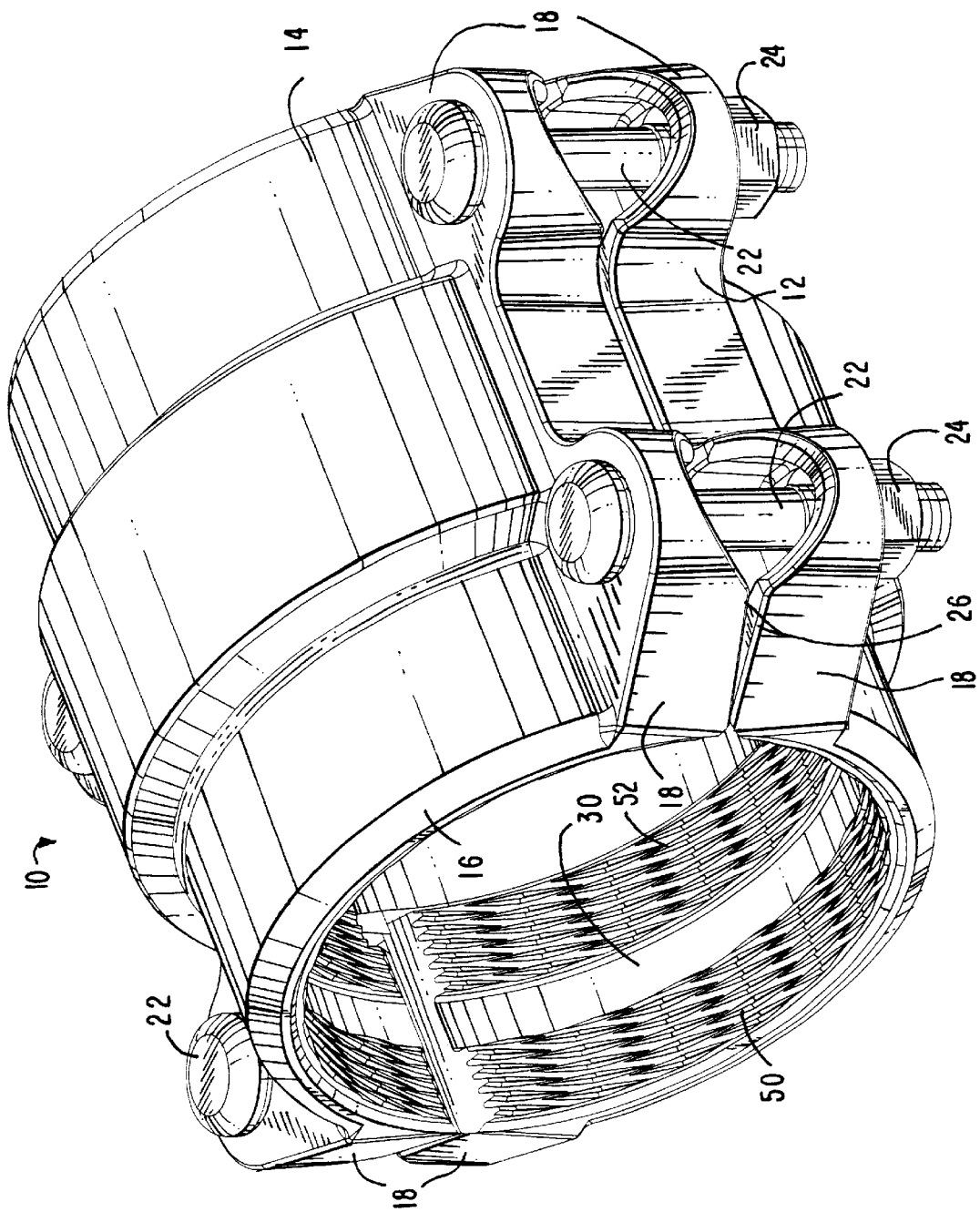
FIG. 1 is a perspective view of one form of the present invention, showing a coupling intended for securing two plain ended pipes together, with the pipes not shown.

The segmented pipe coupling 10 shown in FIGS. 1–10 is intended to join the plain ends of two pipes, such as 100, 200 (see FIGS. 4 and 5), which may be formed of polyvinylchloride. Such coupling segments are typically formed of close tolerance casting techniques from ductile iron. The segmented pipe coupling of this embodiment includes two coupling segments 12, 14. The coupling segments are identical with each other and are substantially semi-circular in form, each coupling member half being comprised of an arcuate body 16 which terminates at its ends in radially outwardly extending bolting pads 18 formed integrally with the body portion 16. While the particular segmented coupling 10 is comprised of only two coupling members, it will be well appreciated as is well known in the coupling art, that the segmented coupling could comprise three or more coupling segments which may be used in conjunction with larger diameter pipes. The use of multiple coupling segments facilitates the manual handling of the segments and the assembly of the coupling onto such larger diameter pipes. Additionally, the formation of such larger size segmented couplings from multiple coupling segments facilitates the forming of the respective coupling segments to closer tolerances that might otherwise be possible in the case of a large segmented coupling comprised of only two arcuate coupling segments.

Each of the radially extending bolt pads 18 includes apertures 19 for the reception of fastening members, which may typically be headed bolts 22. When in an assembled condition, the respective coupling segments 12, 14 are secured to each other in end circling relationship about the ends of pipes 100, 200 by the headed bolts 22 and conventional nuts or lock nuts 24 threadedly received on the bolts. Advantageously, each of the bolt pads 18 includes radially inward shoulder 26. The shoulders of the arcuately adjacent coupling segments are pre-determinedly configured to meet as the arcuate coupling segments are bolted together, with the contact engagement of shoulders 26 limiting the radially inward movement of the arcuate segments 12, 14 as the bolts are tightened. This pad-to-pad limiting engagement of the shoulder surfaces of adjacent segments advantageously assures the desired gripping engagement without the need to use bolt torques as a guide.

Internally of each coupling segment 12, 14 and intermediate the axial length thereof in the embodiment illustrated, is a recess 30 in which a lubricated gasket 32 is inserted. The gasket is employed to seal the pipes 100, 200 when the coupling is in the assembled condition with the nuts 24 tightened.

In accordance with the present invention, an array of a successive series of circumferentially discontinuous teeth extend radially inward along the interior arcuate surface of each of the coupling segments, with two such areas of teeth 50, 52 being illustratively in each of the coupling segments. It should, however, be understood that alternatively a single area of such teeth may be provided in an area which substantially expands the entire width between the axial end extremes of areas 50, 52. These teeth are provided to securely engage the exterior surfaces of the polyvinylchloride pipe, as best shown in FIGS. 5 and 7 through 10. It is most important in accordance with the present invention that the teeth be configured such that they engage the exterior surfaces of the pipe 100, 200, without cutting into the pipe exterior. This is to be contrasted to the gripping pattern of teeth in the coupling members typically used for high density polyethylene pipe which are intended to puncture and bite into the exterior surface of the pipe in order to maintain secure engagement therewith under conditions of ambient temperature extremes. Such coupling segments which have provided satisfactory performance for coupling plain ended high density polyethylene pipe are typified by Styles 994, 995, and 997 of the Victaulic Company of America.

Figure 2:
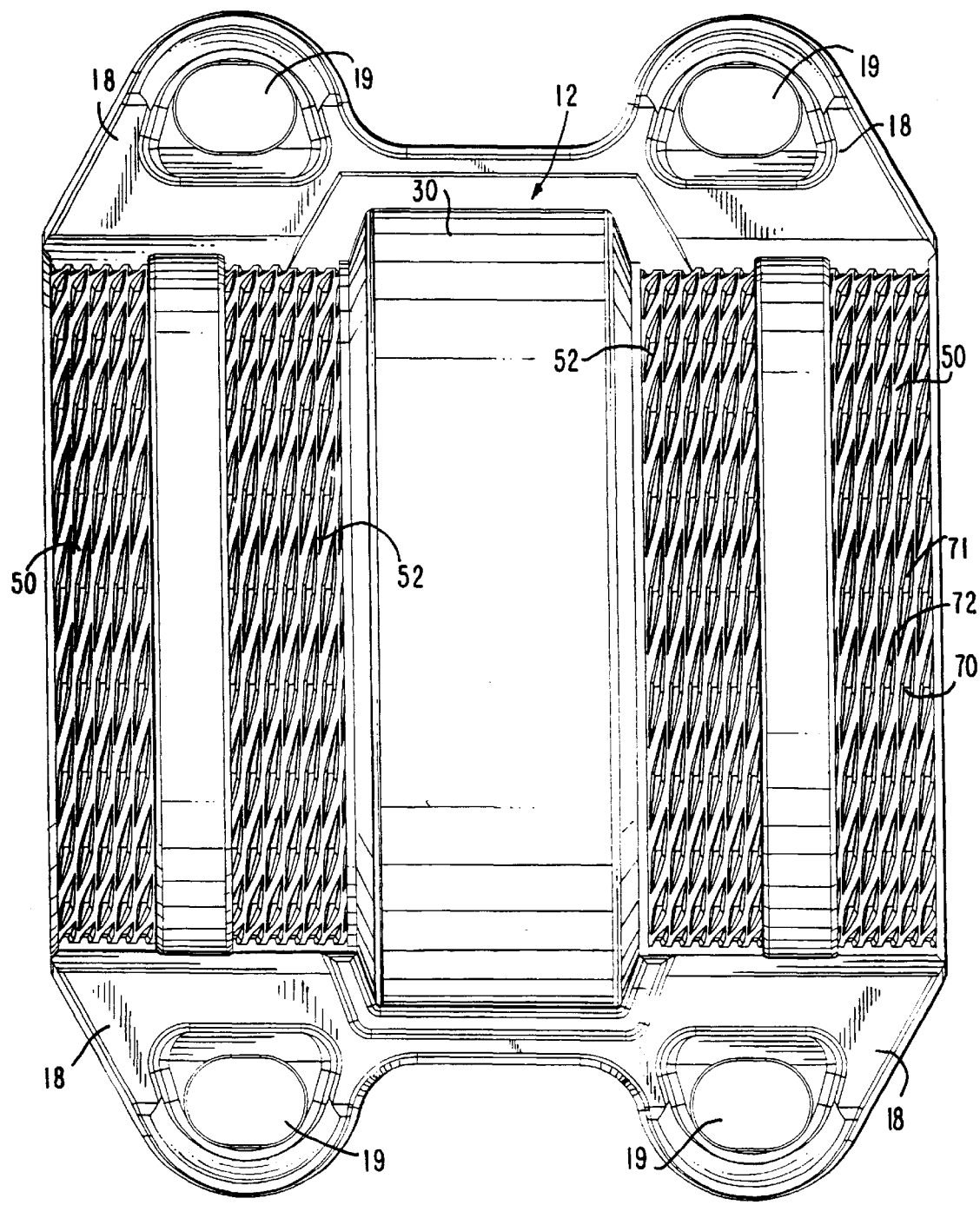
FIG. 2 is an interior plan view of one of the coupling segments.
Figure 3:
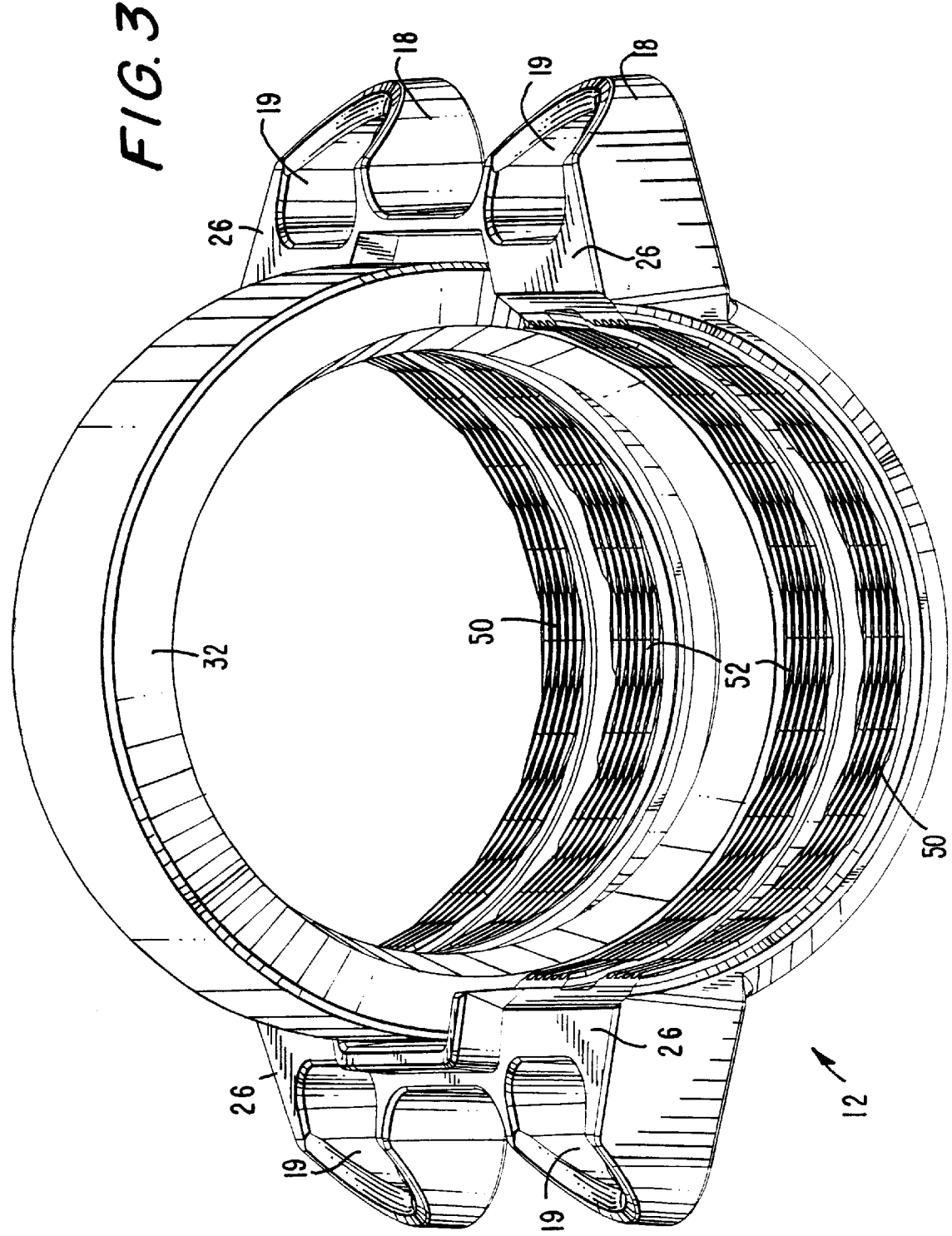
FIG. 3 is a perspective view of one of the coupling segments with the intermediate sealing gasket.
Figure 4:
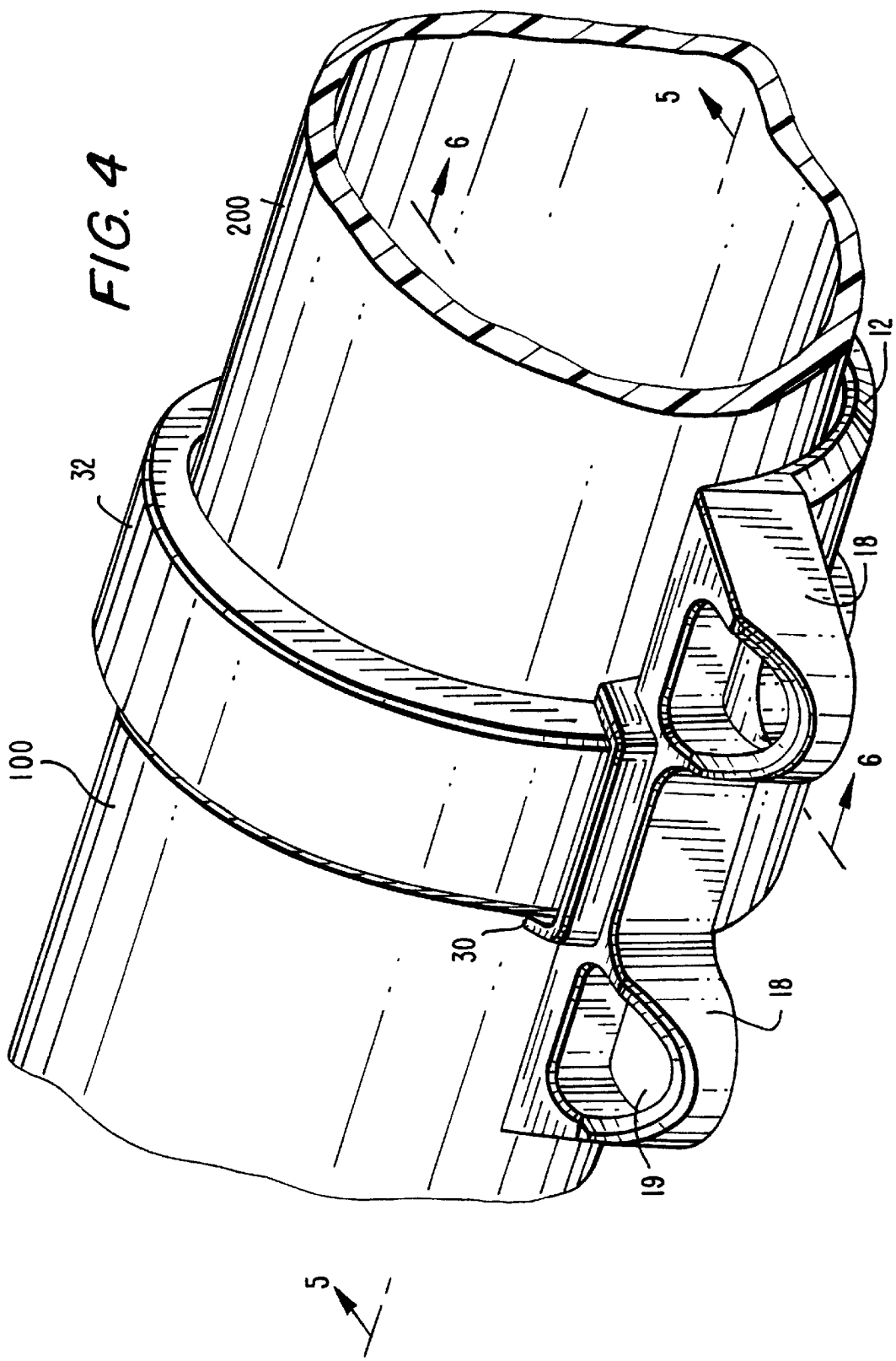
FIG. 4 is a perspective view showing the segmented pipe coupling about the pipe, but prior to the bolting thereof.
Figure 5:
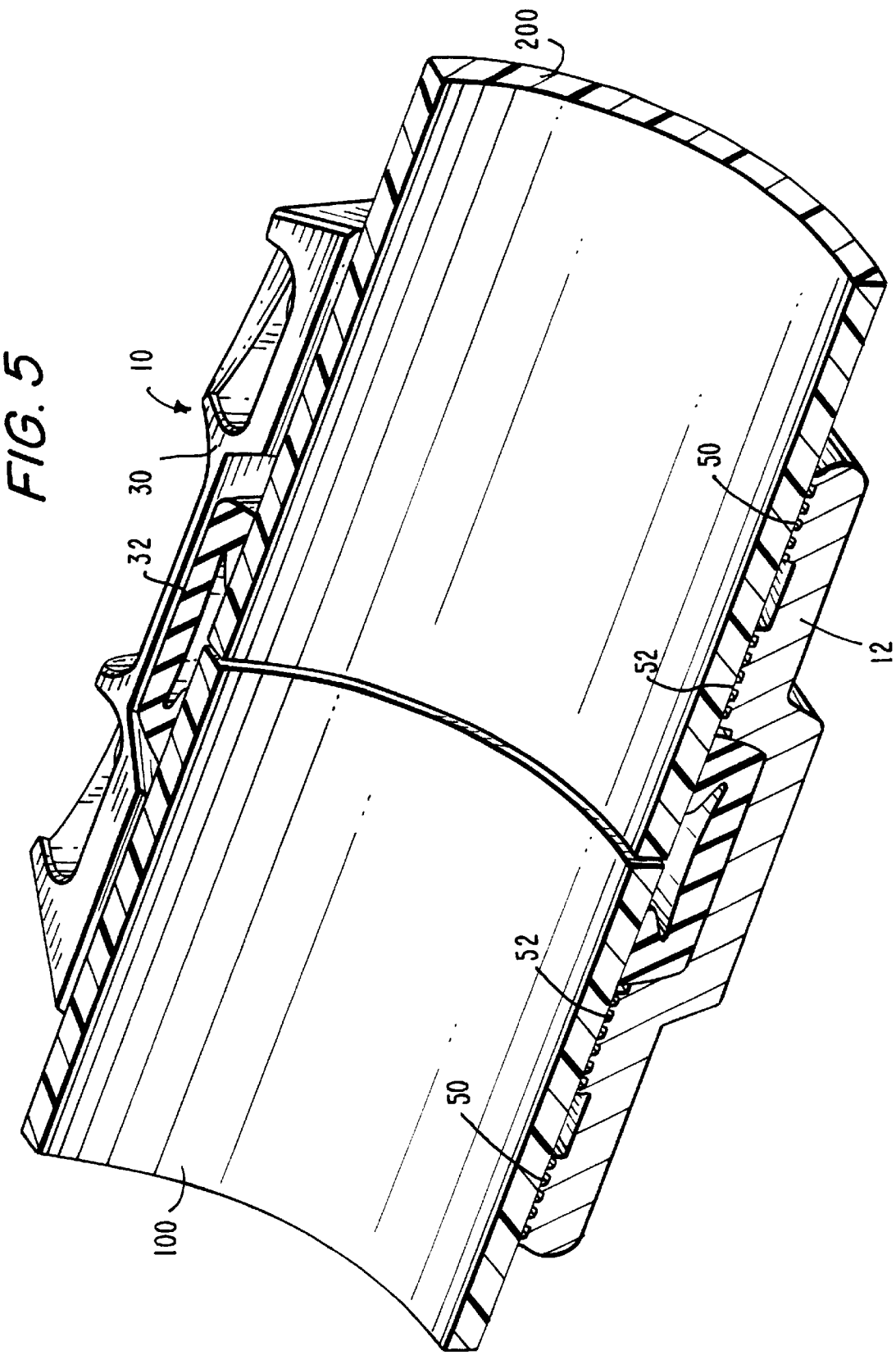
FIG. 5 is a cross sectional view along the lines 5—5 shown in FIG. 4 and looking in the direction of the arrows.
Figure 6:
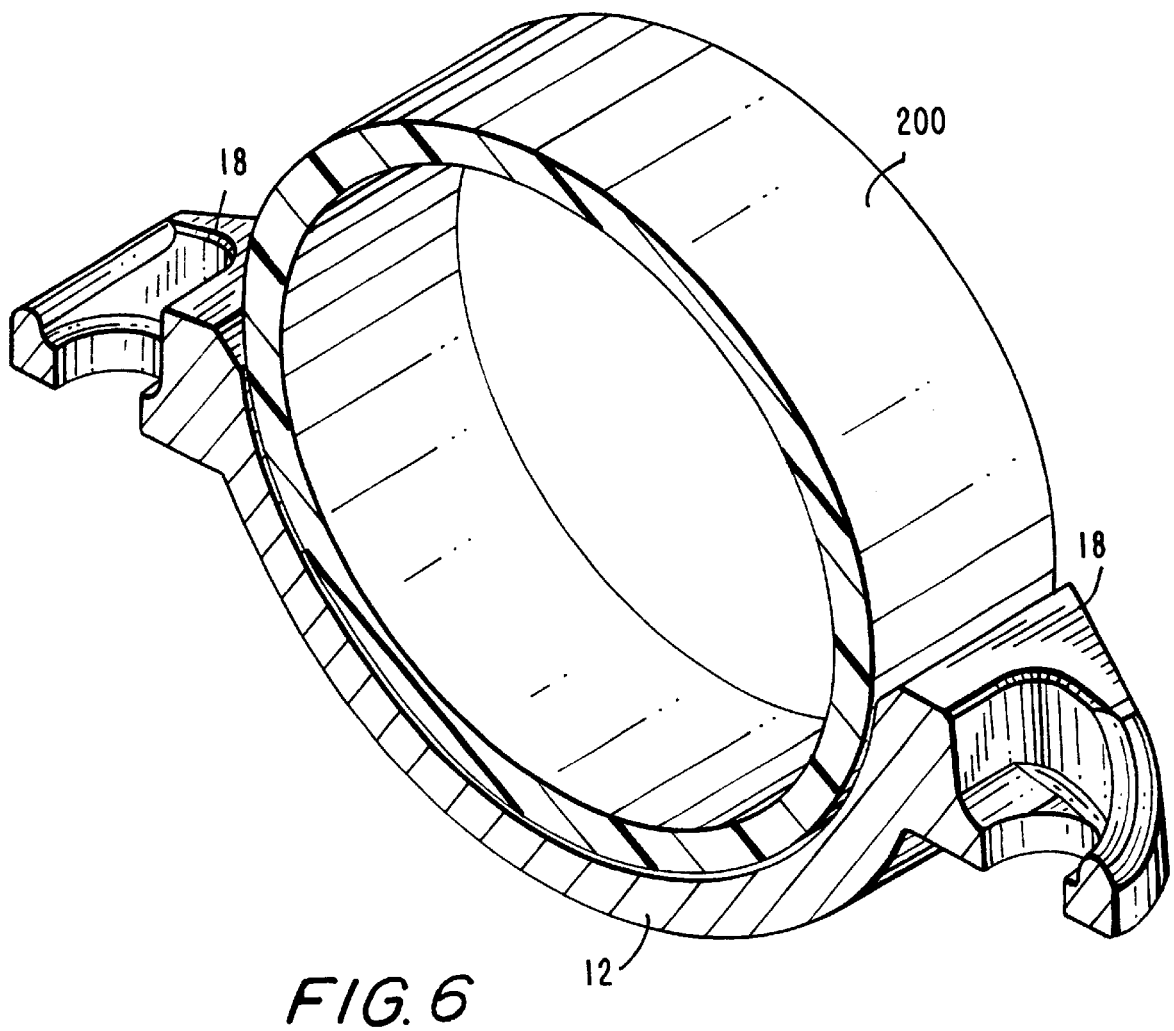
FIG. 6 is a cross sectional perspective view along the line 6—6 shown in FIG. 4 and looking in the direction of the arrows.
Figure 9:
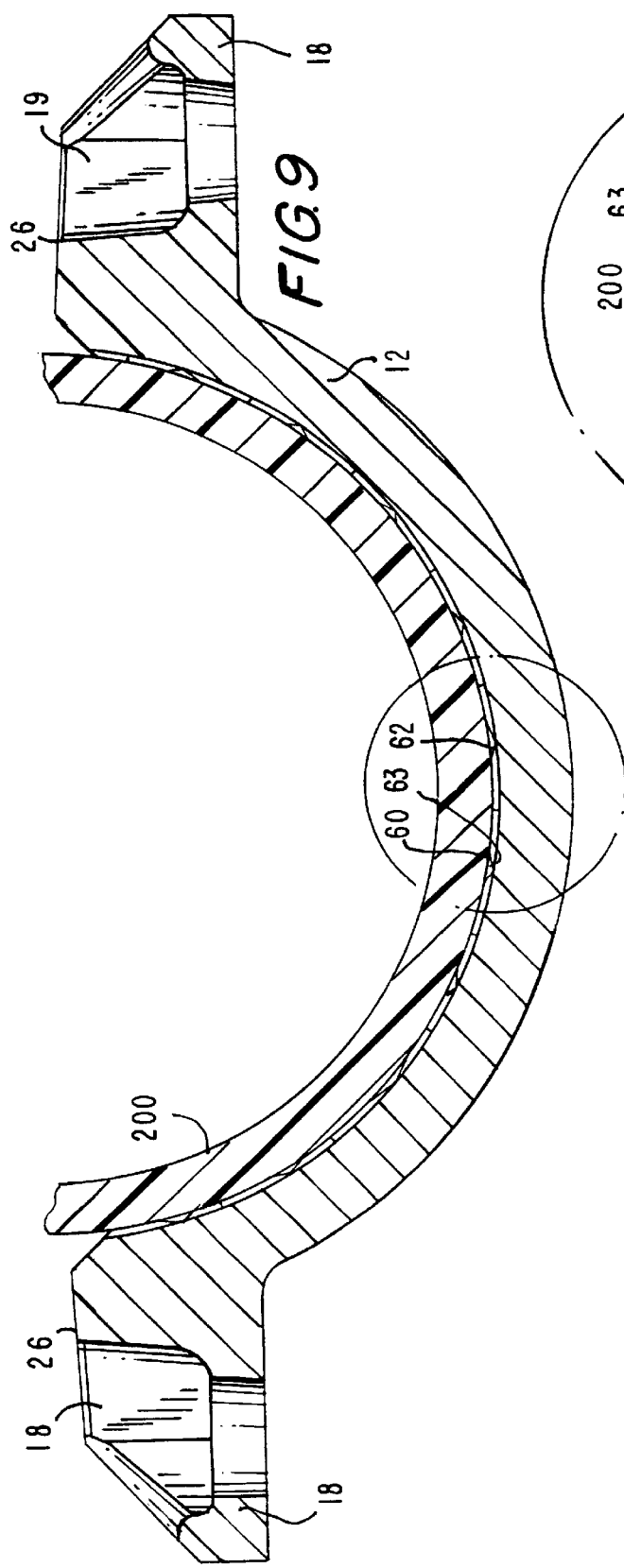
FIG. 9 is a front cross-section view showing the lower portion of FIG. 6.
Figure 10:
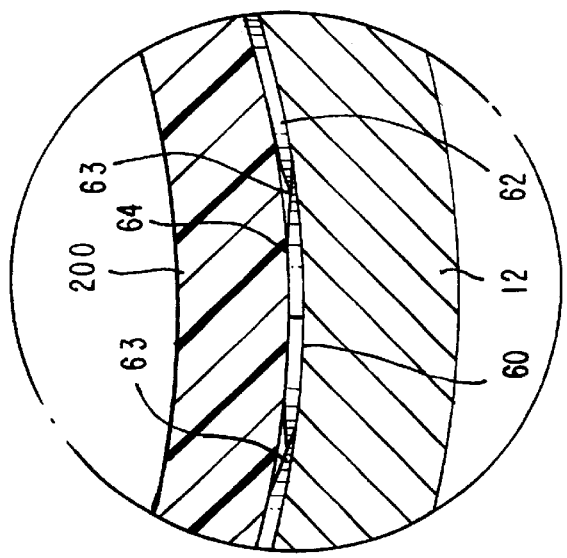
FIG. 10 shows further details of FIG. 9 as indicated by the circled portion thereof.

The individual gripping teeth in areas 50, 52 are circumferentially discontinuous. Referring to FIGS. 9 and 10, successive circumferentially adjacent teeth, such as 60, 62 include a central radially innermost flat section 64 and inclined end sections 63. As shown in FIG. 2, the teeth, in alternate circumferential rows, will be in circumferential alignment and the teeth in adjacent rows, such as 70, 71, will be circumferentially spaced. Further, such circumferentially adjacent teeth 70, 71 may also be considered to be axially spaced by virtue of their location in adjacent rows.

Thus, it should be appreciated that the individual teeth provided within areas 50, 52 provide a successive series of circumferentially discontinuous teeth extending radially inward along the interior arcuate surface of the coupling segment. By virtue of their substantially flat, blunt ends, in conjunction with the controlled tightening of the coupling segments which is limited by the engagement of shoulders 26 of the flange ends, the teeth will provide a plurality of spaced engaged surfaces with the exterior of the pipe to securely hold the pipe, without puncturing the pipe surface. The utilization of individual spaced teeth, rather than an uninterrupted circumferential ribs, achieves several advantages. The spaced teeth permit the plastic of the pipe to move radially inwardly, axially along the pipe and circumferentially. This reduces the load required to provide the requisite depth grip. Further, circumferential depressions provide sources of higher stress concentration than would be present in the spaced teeth of the present invention. This is particularly important in cyclic pressure and/or bending applications, since cyclic pressure repeatedly strains the pipe, the areas of highest stress provide weakened areas and locations with a tendency to initiate pipe failure. Accordingly, the spaced dents of the present invention, as compared to circumferential depressions, provide reduced stress to the pipe.

A particularly advantageous method of configuring the gripping teeth is to form the teeth of superimposed multi-lead right and left handed threads along its interior arcuate surface. One such method is to successively machine multi-lead right and left hand threads into the previously cast internal arcuate portion of the segmented pipe coupling. Alternatively, the final configuration of spaced gripping teeth can be cast into the coupling.

Accordingly, it should be appreciated that the present invention is directed to a coupling component which includes a successive series of circumferentially discontinuous teeth that extend radially inward along the interior arcuate surface of the coupling segment and are configured to securely grip a plain ended pipe without cutting into the pipe exterior. It has been found that such a coupling component has particular utility in conjunction with cast ductile iron couplings intended for use with polyvinylchloride pipe, since the differential coefficients of expansion between the iron and the polyvinylchloride is not of a magnitude which necessitates coupling teeth to bite into the pipe in order to maintain secure engagement therewith over temperature extremes. Further, while the present invention has been disclosed in conjunction with a coupling member intended to join the plain ends of two pipes, the advantageous discontinuous teeth configuration can be used in conjunction with other types of coupling members intended to secure a plain ended plastic pipe to some other component. Accordingly, these as well as other modifications will suggest themselves to those familiar with pipe couplings which are considered to be within the spirit and scope of the invention as defined by the following claims:

We claim:

1. A segmented coupling device for coupling two pipe elements selected from the group consisting of two plain-ended sections of pipe; and one plain ended section of pipe and a pipe fitting, the segmented coupling comprising a plurality of arcuate coupling segments, each of the arcuate coupling segments including:

a successive series of circumferentially discontinuous teeth extending radially inward along the interior arcuate surface of the coupling segment;

each of the teeth including end sections and a central, radially innermost flat section;

the flat sections of the successive series of teeth providing a plurality of circumferentially discontinuous and spaced gripping surfaces for securely engaging at least one plain ended pipe section without cutting into the pipe exterior;

and each arcuate coupling segment having means for being detachably attached to at least one other adjacent arcuate coupling segment in surrounding relationship around an outer circumference of the abutting ends of the two pipe elements to be coupled.

2. An arcuate coupling segment according to claim 1, wherein, successive circumferentially adjacent teeth are axially spaced.

3. An arcuate coupling segment according to claim 1, wherein the teeth include a plurality of individual circumferentially aligned and axially spaced teeth.

4. An arcuate coupling segment according to claim 1, wherein, the teeth include a plurality of individual circumferentially aligned and axially spaced teeth, and successive circumferentially adjacent teeth are axially spaced.

5. An arcuate coupling segment according to claim 1, wherein, the teeth are formed within an axially seriatim plurality of circumferential rows, each of the rows including a successive series of spaced individual teeth, and the flat surfaces of adjacent teeth within a circumferential row being separated by an end section forming a juncture and spacing between the adjacent teeth within a circumferential row.

6. The arcuate coupling segment according to claim 5, wherein the teeth in spaced alternate circumferential rows are in circumferential alignment.

7. The arcuate coupling segment according to claim 6, wherein the teeth in adjacent rows are circumferentially spaced.

8. The arcuate coupling segment according to claim 7, wherein the teeth are formed of superimposed multi-lead right and left handed threads along an interior arcuate surface of the segment.

9. The arcuate coupling segment according to claim 5, wherein the teeth in adjacent rows are circumferentially spaced.

10. The arcuate coupling segment according to claim 5, wherein the teeth are formed of superimposed multi-lead right and left handed threads along an interior arcuate surface of the segment.

11. An arcuate coupling segment according to claim 1, wherein the teeth are formed of superimposed multi-lead right and left handed threads along an interior arcuate surface of the segment.

12. An arcuate coupling segment according to claim 1, which is formed of iron and is intended for use with plain-ended PVC pipe.

13. A segmented pipe coupling comprising a plurality of arcuate coupling segments, each of the arcuate coupling segments including:
a successive series of circumferentially discontinuous teeth extending radially inward along an interior arcuate surface of the coupling segment;
each of the teeth including radially inclined end sections and a central, radially innermost, flat section;
the flat sections of the successive series of teeth providing a plurality of circumferentially discontinuous and spaced griping surfaces for securely engaging a plain ended pipe without cutting into the pipe exterior;
each of the arcuate coupling segments including at least one flange at its arcuate end, the flange including a fastener receiving aperture at its outward radial end for detachably attaching adjacent arcuate coupling segments together around the outer circumference of the ends of abutting pipe segments selected from the group consisting of the two plain-ended pipes; and one plain-ended pipe and a pipe fitting, and a radially inward shoulder, such that the shoulders of arcuately adjacent coupling segments are predeterminedly configured to meet as the adjacent arcuate coupling segments are fastened together in order to limit radially inward movement of the fastened coupling segments about the coupled ends of the pipe segments.

14. A segmented pipe coupling for attachment to a first pipe section and a PVC pipe section, the pipe coupling including:
a successive series of circumferentially discontinuous teeth extending radially inward along an interior arcuate surface of the coupling segment;
each of the teeth including end sections and a central, radially innermost, flat section;
the flat sections of the successive series of teeth providing a plurality of circumferentially discontinuous and spaced gripping surfaces for securely engaging the PVC pipe section without cutting into the pipe exterior; and means for detachably attaching the coupling around an outer circumference of abutting ends of the two pipe sections to be coupled.

15. The segmented pipe coupling according to claim 14, wherein the first pipe section is made from a material selected from the group consisting of metal and plastic.

16. The segmented pipe coupling according to claim 15, wherein the material is plastic.

17. The segmented pipe coupling according to claim 15, wherein the material is metal.

18. The segmented pipe coupling according to claim 17, wherein the metal is iron.

19. The segmented pipe coupling according to claim 17, wherein the plastic is PVC.

20. A segmented pipe coupling comprising a plurality of arcuate coupling segments, each of the arcuate coupling segments including:
a successive series of circumferentially discontinuous teeth extending radially inward along the interior arcuate surface of each coupling segment;
each of the teeth including a substantially flat gripping surface;
the substantially flat gripping surfaces of the successive series of teeth providing a plurality of spaced gripping surfaces for securely engaging a plain ended pipe without cutting into the pipe exterior.

21. The segmented pipe coupling according to claim 20, wherein the teeth are formed of superimposed multi-lead right and left handed threads along an interior arcuate surface of the coupling.

22. The segmented pipe coupling according to claim 20 wherein:
each of the arcuate coupling segments includes at least one flange at an arcuate end, the flange further including a fastener receiving aperture at an outward radial end thereof for detachably attaching adjacent arcuate coupling segments together around the outer circumference of the ends of the abutting plain ended pipes, and a radially inward shoulder, such that the shoulders of arcuately adjacent coupling segments are predeterminedly configured to met as the adjacent coupling segments are fastened together in order to limit radially inward movement of the fastened coupling segments about the coupled ends of the plain ended pipes.

* * * * *